Sept. 24, 1935.    T. MANABE    2,015,488
CONCRETE PLANT
Filed July 18, 1932    2 Sheets-Sheet 1

Inventor
T. Manabe
By Marks & Clerk
Attys

Sept. 24, 1935.     T. MANABE     2,015,488
CONCRETE PLANT
Filed July 18, 1932     2 Sheets-Sheet 2

Inventor
T. Manabe
By Marks & Clerk
Attys

Patented Sept. 24, 1935

2,015,488

UNITED STATES PATENT OFFICE 2,015,488

CONCRETE PLANT

Takeo Manabe, Iriarai-Machi, Ebara-Gun,
Tokyo-Fu, Japan

Application July 18, 1932, Serial No. 623,228

2 Claims. (Cl. 83—73)

This invention relates to an improvement of a concrete plant, whereby all ingredients composing concrete may be measured and supplied to a concrete mixer in the manner described hereinafter. The primary object of this invention is as follows:

Instead of making concrete with four elements consisting of fine aggregate (sand), coarse aggregate (gravel), cement and water, this invention aims at having concrete with three constituents of sand, gravel and cement paste (cement and water mixed) and thus obtaining a new and useful concrete plant necessary to attain such object.

Another object of this invention is to pour or add cement paste which has a certain fixed proportion of cement and water to sand and gravel and which also has a certain fixed proportional quantity, thus changing the workability of the concrete by the quantity of cement paste, without changing the strength and thus furnishing a device for measuring and supplying concrete materials in which uniform and required strength is maintained.

Another object of this invention is to furnish a device or apparatus for making and supplying cement paste (consisting of cement and water), that is, an apparatus or device consisting of a cement and water mixing and agitating tank and an adjustable measuring and supplying vessel for cement paste.

Still another object of this invention is that in the aforesaid cement paste apparatus, between the cement and water mixing tank and cement paste, an adjustable measuring vessel, a cement paste hydrating storage basin is provided and by means of gate valves connecting them and provided therein the operation is made continuous.

In case a cement paste hydrating storage basin is provided on top of the cement paste mixing tank, the paste is conveyed upwards by a conveying arrangement such as pump.

In any of the above cases, a cement paste adjustable measuring and supplying vessel is arranged so that the content may be changed at will.

In order to make this invention clear, an example of the concrete plant of this invention will be hereafter described with reference to the accompanying drawings.

Figure 1:
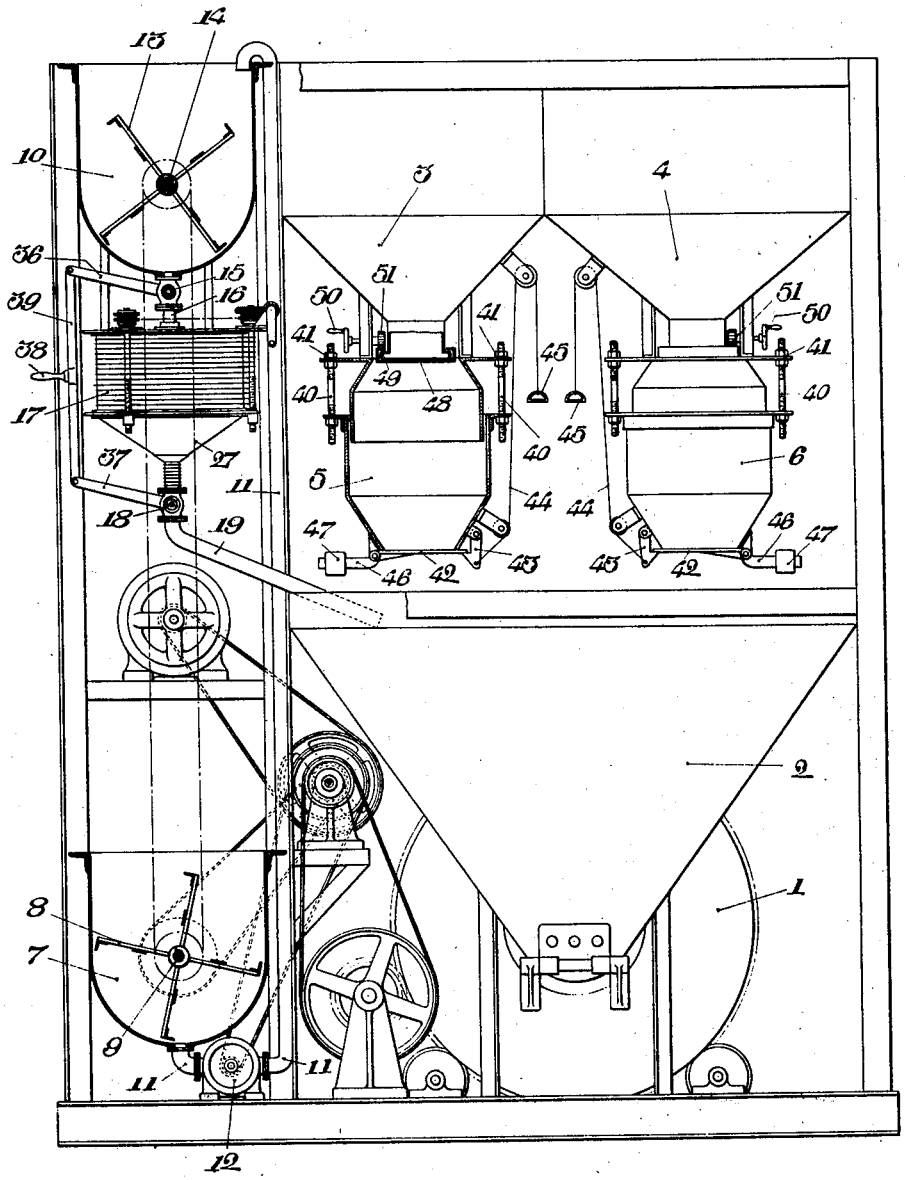
Figure 2:
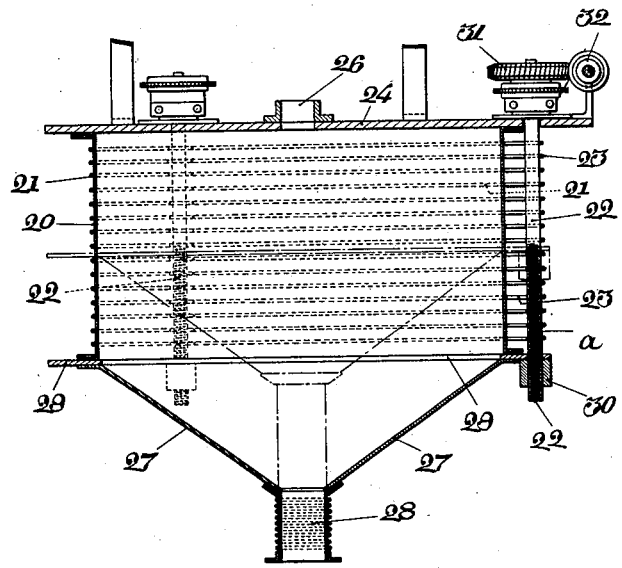
Figure 3:
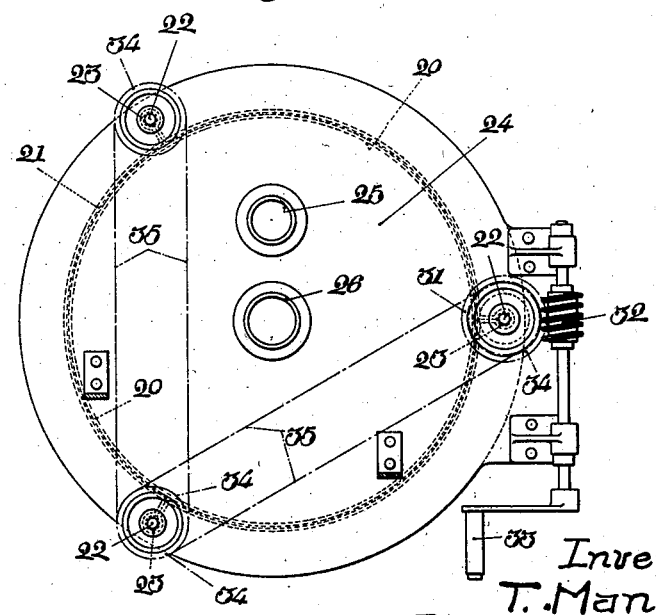

Fig. 1 shows the plant in elevation and of the plant partly in section. Fig. 2 is the longitudinal front elevation of the cement paste adjustable measuring and supplying vessel and Fig. 3 is the plan of Fig. 2.

Referring now to the drawings, 1 is the concrete mixer. 2 is the hopper for the concrete mixer from which concrete materials will be supplied.

Above the hopper 2, sand bin 3 and gravel bin 5 are provided side by side and between these bins 4 and hopper 2, adjustable batches (telescopic and adjustable vessel) 5 and 6 are provided for measuring the contents of sand and gravel. The bottom plates of these vessels are arranged so that they may be opened. Thus the required quantity of sand and gravel may be measured and they may be supplied to the hopper 2 and subsequently to the mixer. In case sand and gravel are measured by weights, hopper balance or weighing systems will be used.

To one side of the sand and gravel supplying apparatus and on a frame located at the same height with the mixer 1, a tank 7 is provided for mixing and agitating cement and water and in the tank 7 an agitating device 8 is provided.

The object of this agitating tank is to mix and agitate the fixed quantity of cement and water and thus make cement paste of uniform and homogeneous composition.

Below the cement mixing tank 7 and suitably elevated above the hopper 2, the cement paste hydrating and storage basin 10 is provided. The basin 10 and the tank 7 are connected by the pipe 11 for the conveyance of cement paste.

Inside the hydrating storage basin 10, an agitating device 13 is provided which prevents the settling of cement or the separation of the two elements.

Below the cement hydrating and storage basin 10, an adjustable cement paste measuring and supplying vessel 17 is provided and connected to the hydrating basin 10 by connection pipe 16 provided with valve 15. Under the adjustable measuring vessel 17 a supply pipe 19 is provided and fitted with a valve 18 and the downward end of the pipe is open to the hopper 2. The object of this pipe 19 is to discharge cement paste into the vessel 2 to the concrete mixer 1.

As shown in Fig. 2 and in Fig. 3, the cement paste adjustable measuring and supplying vessel 17 has side walls made of flexible water proof material such as canvas or rubber-coated sheet and is surrounded by many supporting rings 21 running parallel to one another. On the outer side of these supporting rings, some upright rods are provided (three rods shown on the drawings).

Clamps 23 formed together with the sustaining rod 21 go round the rods 22 so as to be able to make upward and downward motion. These will prevent any lateral motion of the supporting rings 21 and at the same time allow the upward and downward parallel motion of the supporting rings 21.

The upper end of the flexible side wall 20 is connected to the top plate 24 and in the top plate 24, cement paste supply hole 25, cleaning hole 26 and float valve are provided.

At the bottom end of the side wall, bottom funnel 27 is suspended and at the lowest part of the funnel, flexible discharge pipe 28 is fixed, and the downward end of which is connected to the supply pipe 19 fitted with valve 16 in the pipe. Near the outer side of bottom frame 29 and at the lower ends of the guide rods 22, nuts 30 fixed to the bottom frame are provided and engage with the screw threads a in the rods 22.

On the top portion of one of the guide rods 22 worm wheel 31 is provided and worm 32 which gears with the worm wheel is provided on the outer side.

This worm 32 is rotated by a handle 33 and transmits the motion to worm wheel and guide rod 22.

This will cause the nut 30 to make upward and downward motion along the threaded portion of the guide rod 22.

The upright rod 22 fitted with worm wheel 31 is connected to other upright rods by means of chain wheels 34 and endless chains 35 so that when one upright rotates, all other uprights will rotate in the same direction simultaneously. The result is that all nuts will move up and down on the uprights by a certain distance equal in all cases.

Referring to the aforesaid adjustable measuring apparatus, accompanying the upward and downward motion of the nut 30, the supporting rings 21 also move correspondingly and thus the flexible side walls of the vessel contract or expand or in other words, the depth of the adjustable vessel 17 varies and thus the inside volume also varies.

By a suitable mechanism and through the motion of nut 30, the sustaining frame walls move up or down, resulting in the change of the volume of the adjustable vessel. 36 is the lever for the valve 15 and 37 is the lever for the valve 18.

The measuring vessels for sand and gravel 5 and 6 consist of two parts upper and lower which fit together and are arranged in such a way that the depth of the vessels can be varied.

The lower section is made to be able to move up and down by means of a threaded rod 40 and adjusting screw 41 and thus the contents of the vessels are adjusted.

On the bottoms of these vessels, bottom covers 42 which may be made to open and shut are provided. To secure the bottom covers 42 in closed position, a movable hook 43 for each is secured to the vessel and made to engage with the under side of the bottom plate and by the weight of the material within the vessel, the bottom plate is kept in closed position. To the hook 43, a rope 44 is attached, which passes over a pulley and carries a handle 45 on the free end. When the handle is pulled, the hook 43 disengages from the bottom plate and the sand or gravel contained in the vessels 5 or 6 is discharged to the hopper 2.

On the other side of each of the vessels a lever 46 is provided and a counter-weight 47 is mounted on the lever. On account of the counter-weight 47, the bottom plate may again be restored to closed position.

At the bottom part of the hoppers 3 and 4, removable doors 48 are provided, which may be opened or shut by means of handles 50 and pinions 51 which latter are made to engage with the racks 49.

Generally, the strength of concrete depends on the proportion of cement and water contained in the cement paste and according to the concrete plant of the present invention, I am able to add to sand and gravel, certain proportional quantity of cement and water in the cement paste and therefore I am able to give a specified strength to the resultant concrete.

Again according to the concrete plant of the present invention, the workability is properly regulated according to the amount of cement paste, mixed to gravel and sand, also having certain measured proportion and as I am using cement paste having fixed proportion of cement and water, I may obtain concrete of uniform strength.

Again according to the concrete plant of the present invention, as cement paste is first formed by mixing cement and water, water thoroughly penetrates to the particles of the cement and perfects the hardening activity due to hydraulic decomposition of the cement and therefore concrete of greater strength may be obtained, compared with one prepared by usual methods.

Again according to the concrete plant of the present invention, cement and water is mixed first to form a cement paste, and therefore the mixture of the same with gravel and sand is very easy, thus resulting in a considerable saving of time and increase of the efficiency of concrete work.

Having now described and ascertained the nature of my said invention, I declare that what I claim is:—

1. A concrete plant, comprising a frame, a coarse and fine aggregate batcher unit on one side of the frame for measuring the aggregate, and on the other side of the frame a tank for mixing and agitating cement and water, a hydrating basin for promoting the action of hydration of cement and at the same time storing therein the cement paste in order to make the operation continuous, and a cement paste measuring and supplying vessel, which is provided with a cylindrical side wall made of flexible waterproof material, and supporting rings running parallel to one another surrounding the said wall adapted to change the height of the wall, suitable transmission mechanism provided at the bottom of the vessel adapted to give an upward and downward motion, thus causing the contents of the vessel to change at will.

2. A concrete plant in accordance with claim 1 in which are provided gate valves connecting the vessel, tank and basin.

TAKEO MANABE.